US012285807B2

(12) United States Patent
Nishimiya

(10) Patent No.: US 12,285,807 B2
(45) Date of Patent: Apr. 29, 2025

(54) STRUCTURE

(71) Applicant: KITAGAWA IRON WORKS CO., LTD., Fuchu (JP)

(72) Inventor: Tamio Nishimiya, Fuchu (JP)

(73) Assignee: KITAGAWA IRON WORKS CO., LTD., Fuchu (JP)

( * ) Notice: Subject to any disclaimer, the term of this patent is extended or adjusted under 35 U.S.C. 154(b) by 796 days.

(21) Appl. No.: 17/429,701

(22) PCT Filed: Feb. 28, 2020

(86) PCT No.: PCT/JP2020/008370
§ 371 (c)(1),
(2) Date: Aug. 10, 2021

(87) PCT Pub. No.: WO2020/179674
PCT Pub. Date: Sep. 10, 2020

(65) Prior Publication Data
US 2022/0203458 A1 Jun. 30, 2022

(30) Foreign Application Priority Data
Mar. 6, 2019 (JP) ................................. 2019-040894

(51) Int. Cl.
*B23B 31/16* (2006.01)

(52) U.S. Cl.
CPC .. *B23B 31/16279* (2013.01); *B23B 31/16283* (2013.01); *B23B 2260/12* (2013.01);
(Continued)

(58) Field of Classification Search
CPC ........ B23B 31/16279; B23B 31/16283; B23B 2260/12; B23B 2260/132
See application file for complete search history.

(56) References Cited

U.S. PATENT DOCUMENTS 4,546,988 A * 10/1985 Gailey .............. B23B 31/16279
279/123
5,199,725 A * 4/1993 Jaggers ............. B23B 31/16283
279/123
(Continued)

FOREIGN PATENT DOCUMENTS

CN 1817530 A 8/2006
CN 2815558 Y 9/2006
(Continued)

OTHER PUBLICATIONS

International Search Report issued on May 26, 2020 in corresponding International Application JP2020/008370; 7 pages.
(Continued)

*Primary Examiner* — Eric A. Gates
(74) *Attorney, Agent, or Firm* — Maier & Maier, PLLC

(57) ABSTRACT

A structure, including first and second portions respectively having a serration in which peaks and valleys are continuous, and configured to adjust relative positions of the first and second portions in an adjustment direction by interlocking the peaks and valleys with each other. The adjustment direction is a direction in which the peaks and valleys of the serration are continuous; a fixing portion configured to maintain a defined state. The defined state is a state in which the peaks and valleys are interlocked with each other and the relative positions of the first and second portions are fixed; and a positioning mechanism provided on the second portion or the fixing portion, and having a contact portion configured to contact the first portion in the defined state.

5 Claims, 12 Drawing Sheets

(52) U.S. Cl.
CPC ... *B23B 2260/132* (2013.01); *Y10T 279/1986* (2015.01); *Y10T 279/1993* (2015.01)

(56) References Cited

U.S. PATENT DOCUMENTS

| | | | |
|---|---|---|---|
| 6,264,210 B1 | 7/2001 | Difasi et al. | |
| 6,478,311 B1 | 11/2002 | Hinson | |
| 6,491,305 B2 * | 12/2002 | Sida | B23B 31/16279 279/123 |
| 8,272,646 B2 * | 9/2012 | Fink | B23B 31/16279 279/124 |
| 8,984,995 B2 * | 3/2015 | D'Ancona | B23B 31/16279 82/165 |
| 10,016,816 B2 * | 7/2018 | Kim | B23B 31/16279 |
| 2011/0277602 A1 | 11/2011 | Kobayasi | |
| 2015/0209872 A1 | 7/2015 | Chang et al. | |
| 2018/0185929 A1 | 7/2018 | Ishikawa | |

FOREIGN PATENT DOCUMENTS

| | | | |
|---|---|---|---|
| CN | 102292179 A | 12/2011 | |
| CN | 107624085 A | 1/2018 | |
| CN | 109128319 A | 1/2019 | |
| CN | 110997200 A | 4/2020 | |
| EP | 3650151 A1 | 5/2020 | |
| EP | 4032643 A1 | 7/2022 | |
| JP | H4-19703 U | 2/1992 | |
| JP | H10-100007 A | 4/1998 | |
| JP | H11-300509 A | 11/1999 | |
| JP | 6411619 B1 * | 10/2018 | ....... B23B 31/16233 |
| KR | 101534261 B1 | 7/2015 | |
| TW | 201908035 A | 3/2019 | |
| WO | WO-03047812 A2 * | 6/2003 | ......... B23B 31/1076 |
| WO | 2019/021513 A1 | 1/2019 | |

OTHER PUBLICATIONS

Extended European Search Report issued on Mar. 30, 2022, in connection with corresponding European Application No. 20767355.9; 8 pages.

Office Action issued on Nov. 4, 2022, in corresponding European Application No. 20767355.9, 5 pages.

Office Action issued on Feb. 5, 2024, in corresponding Chinese Application No. 202080013029.7, 17 pages.

Office Action issued on Aug. 25, 2023, in corresponding Taiwanese Application No. 109106715, 17 pages.

* cited by examiner

STRUCTURE

FIELD

The present invention relates to a structure.

BACKGROUND

In fields such as industrial machinery, a structure in which relative positions of two portions are determined by a serration in which peaks and valleys are continuous may be used. Patent Document 1 discloses a chuck for gripping a work (workpiece) as an example of a structure having a serration.

[Patent Document 1] Utility Model Application Publication No. H4-19703

SUMMARY

In cases such as reordering from a customer, it may be necessary to reproduce relative positions of two portions in a structure as in the past. However, since the pitch of a serration is not large enough for a human being unconsciously recognize the difference, the reproduction needs a manual process that requires a great deal of sensitivity, and there is a high risk of human error.

The present invention has been in view of the above circumstances and aims to provide a structure capable of reducing the risk of human error when reproducing the relative positions of two portions as in the past.

According to one aspect of the present invention, there is provided a structure, comprising: first and second portions respectively having a serration in which peaks and valleys are continuous, and configured to adjust the relative positions of the first and second portions in an adjustment direction by interlocking the peaks and valleys with each other, wherein the adjustment direction is a direction in which the peaks and valleys of the serration are continuous; a fixing portion configured to maintain a defined state, wherein the defined state is a state in which the peaks and valleys are interlocked with each other and the relative positions of the first and second portions are fixed; and a positioning mechanism provided on the second portion or the fixing portion, and having a contact portion configured to contact the first portion in the defined state.

The structure of the present invention comprises first and second portions respectively having a serration in which peaks and valleys are continuous, wherein the relative positions of the first and second portions can be adjusted regularly and discretely by interlocking the peaks and valleys with each other, and further comprises a contact portion and a fixing portion for maintaining the defined state of the relative positional relationship of the first and second portions. As a result, the relative positions of the first and second portions can be set in a short time without error for work with record.

DETAILED DESCRIPTION

Hereinafter, embodiments of the present invention will be described with reference to the drawings. Various features described in the embodiment below can be combined with each other. For the sake of simplicity, a chuck will be described as an example of a structure, however other structures such as a gripping tool employing a serration used in a machining center can be applied as well.

1. First Embodiment

Figure 1A:
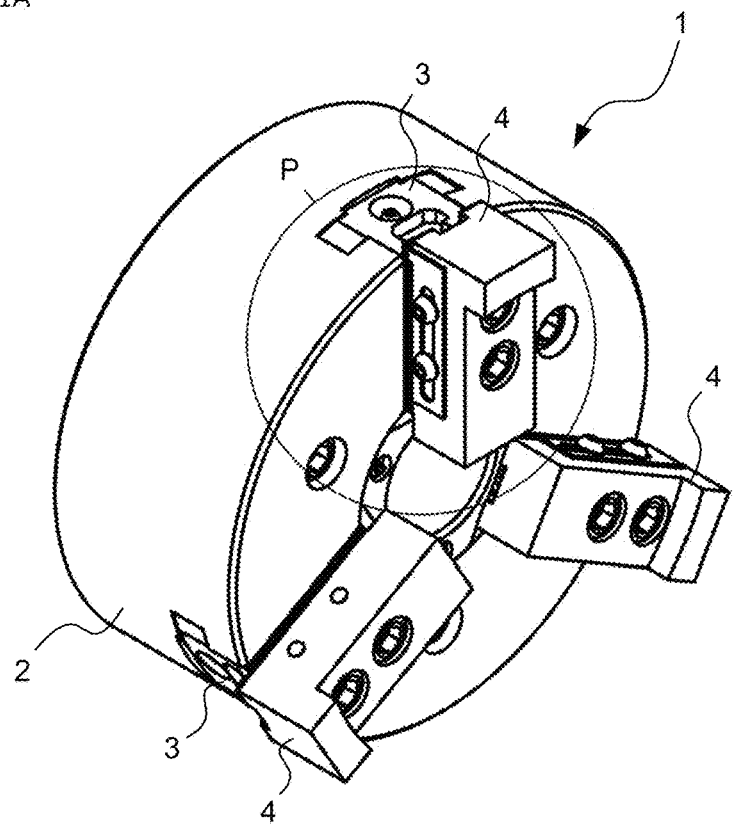
FIG. 1A is a perspective view of a chuck as an example of a structure according to a first embodiment.
Figure 1B:
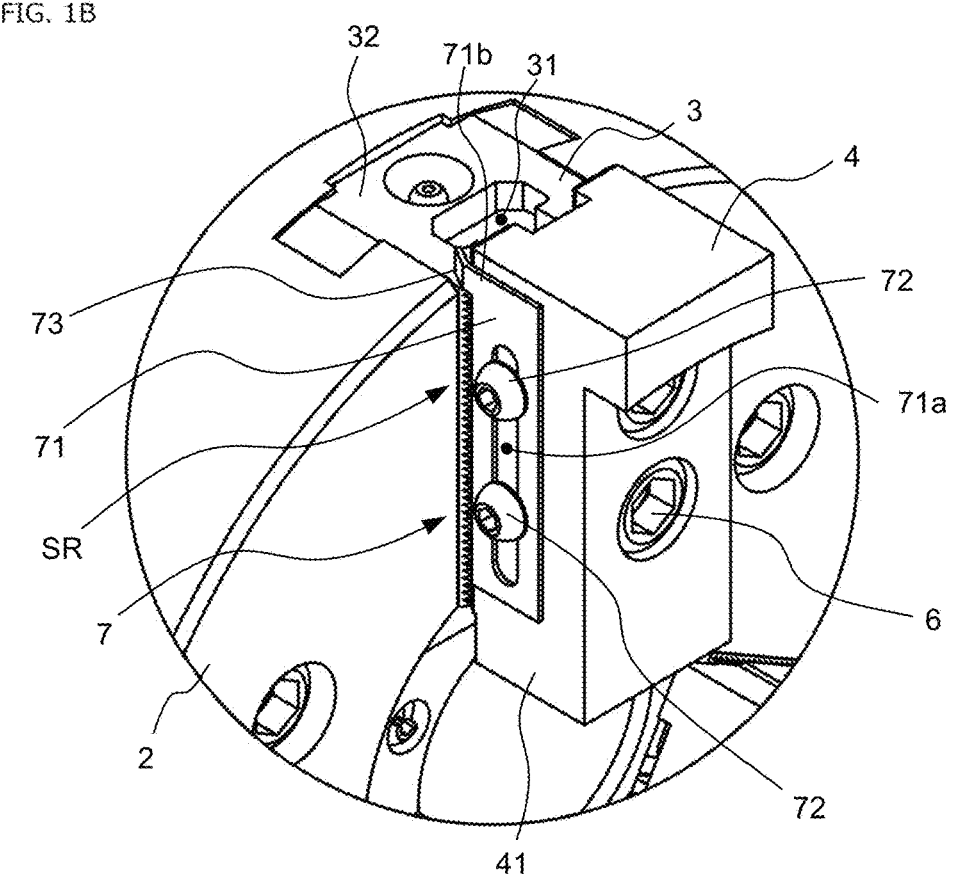
FIG. 1B is a partial enlarged view of a region P in FIG. 1A.
Figure 2A:
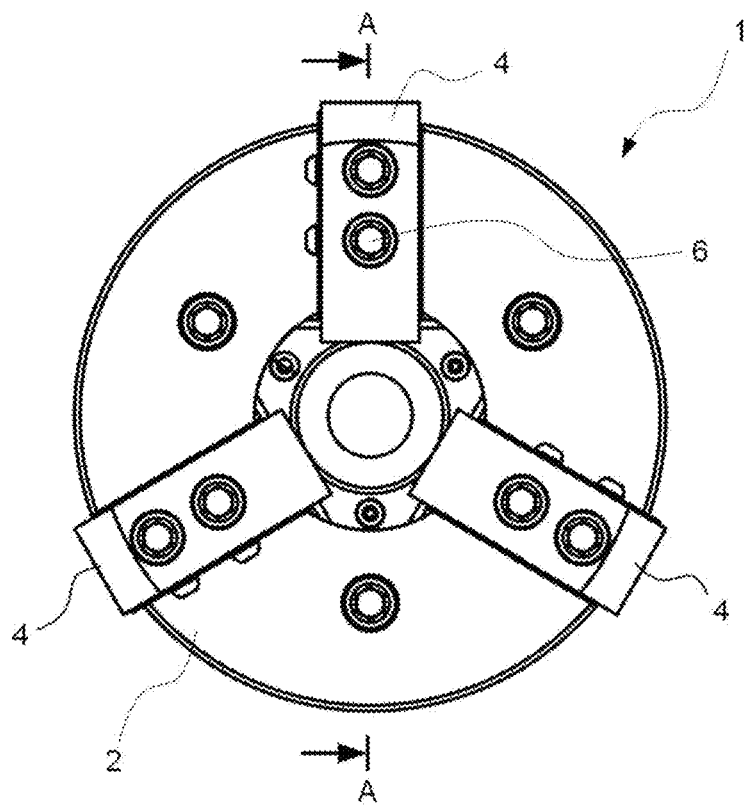
FIG. 2A is a front view of the chuck according to the first embodiment.

In section 1, a chuck 1 according to the first embodiment will be described. FIG. 1A shows a perspective view of the chuck 1 as an example of a structure according to the first embodiment, and FIG. 1B shows a partial enlarged view of a region P in FIG. 1A. FIG. 2A shows a front view of the chuck 1 according to the first embodiment, and FIG. 2B shows a cross-sectional view along line A-A in FIG. 2A.

1.1 Overall Structure

The chuck 1 comprises a body 2 including a master jaw 3 (an example of "first portion" in the scope of claims), a top jaw 4 (an example of "second portion" in the scope of claims) which is mounted on the master jaw 3 and grips a work (unshown), a T-nut 5 (an example of "fixing portion" in the scope of claims) having an inverted T-shape and configured to slide in a groove 31 in the master jaw 3, and a top jaw bolt 6 for fixing the top jaw 4 to the master jaw 3 together with the T-nut 5. Here, although two top jaw bolts 6 are inserted into one top jaw 4, the number is not limited to this.

Figure 2B:
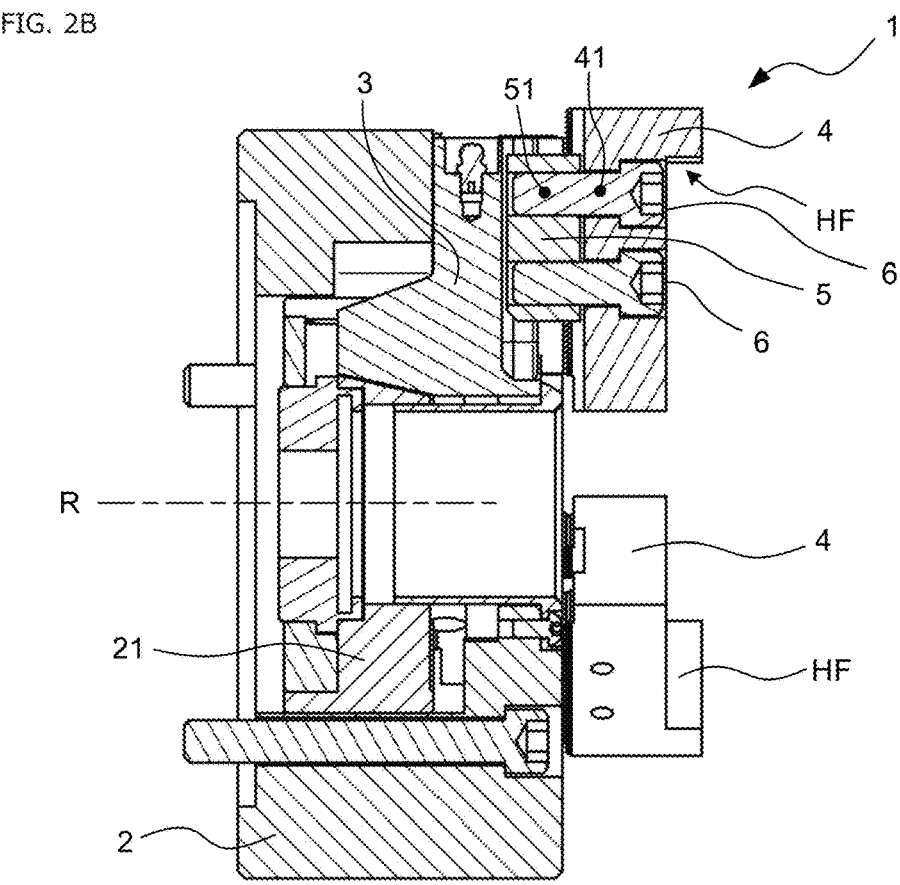
FIG. 2B is a cross-sectional view along line A-A in FIG. 2A.
Figure 3A:
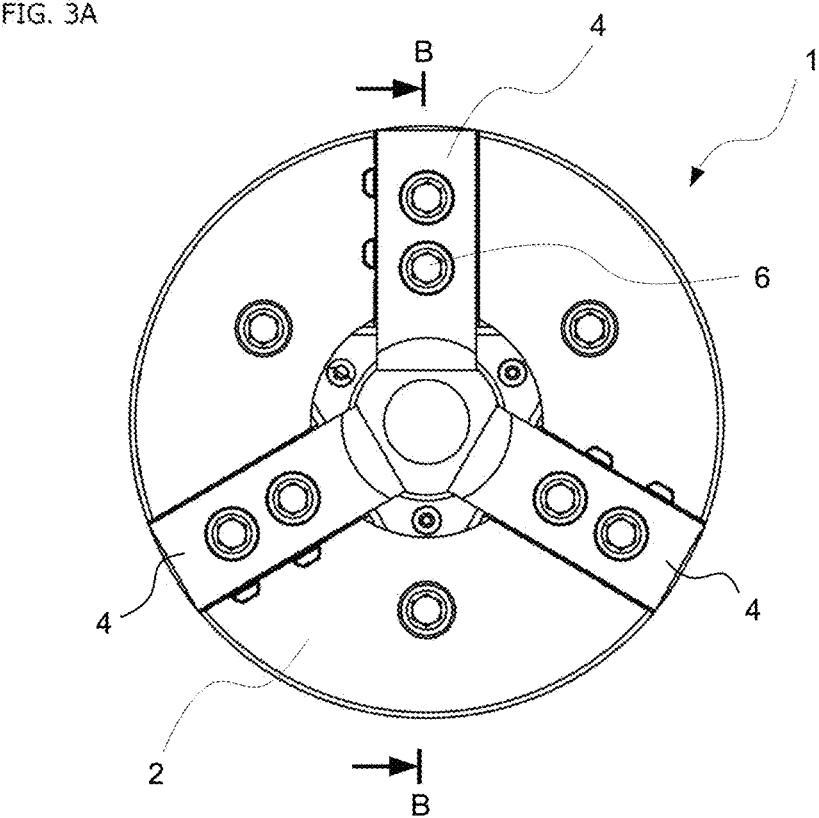
FIG. 3A is a front view of the chuck adjusted with a small gripping diameter.
Figure 3B:
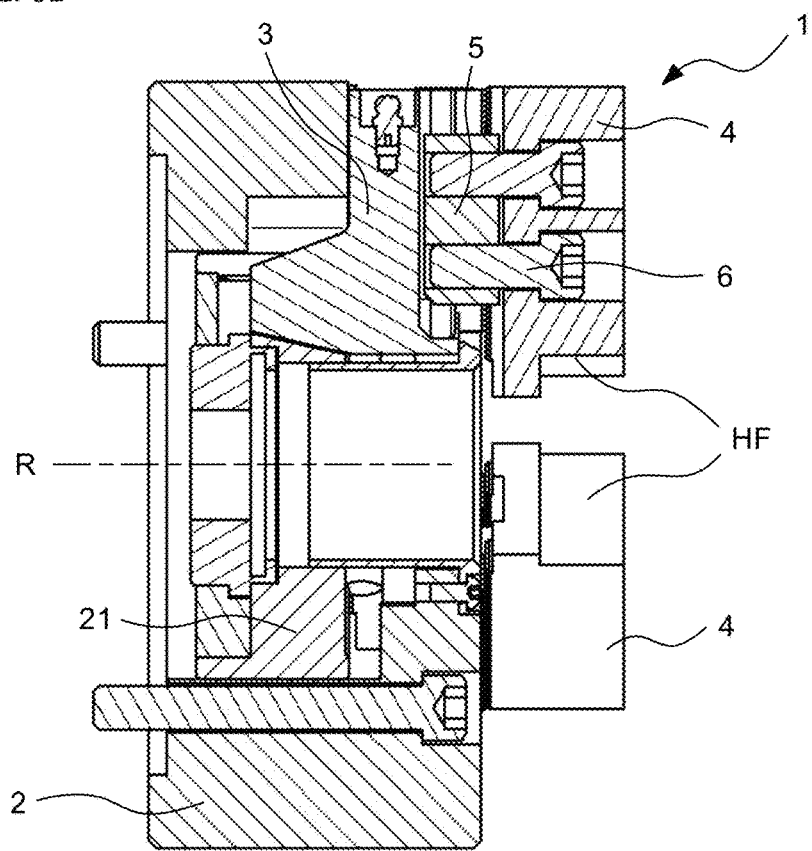
FIG. 3B is a cross-sectional view along line B-B in FIG. 3A.

FIG. 2B shows a state in which a gripping surface HF of the top jaw 4 for gripping the work is machined to a position close to the outer peripheral side. On the other hand, a gripping diameter can be machined to be smaller to fit a small work. A front view of the chuck 1 in this case is shown in FIG. 3A, and a cross-sectional view along line B-B in FIG. 3A is shown in FIG. 3B. The gripping surface HF of the top jaw 4 in FIG. 3B is located inside the chuck 1 as compared with the gripping surface HF in FIG. 2B.

In the present embodiment, as shown in the drawings, although the chuck 1 has been described as including three master jaw 3 and three top jaws 4 corresponding thereto, a chuck including a pair of, or four or more master jaws 3 and top jaws 4 may be applied according to the shape of the work to be gripped, gripping method, the size of the chuck 1, or the size of the top jaw 4. In particular, it should be noted that the master jaw 3, the top jaw 4, the T-nut 5, and the top jaw bolt 6 are arranged at each of three equal positions on the chuck 1 viewed from the front (see FIG. 2A). Since the arrangements on the three positions are all the same, only one of the positions will be described.

Figure 4:
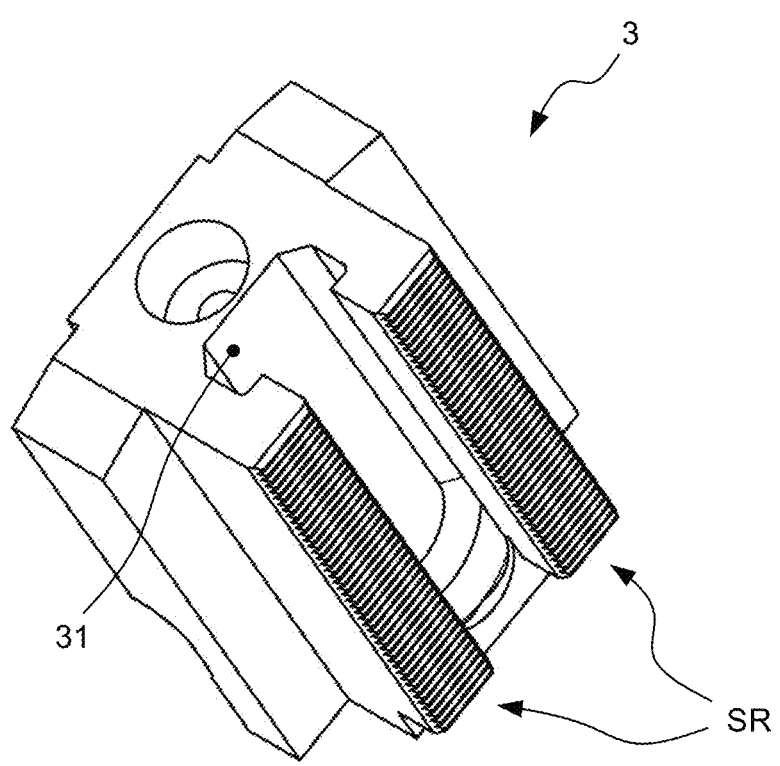
FIG. 4 is a perspective view of a master jaw.
Figure 5:
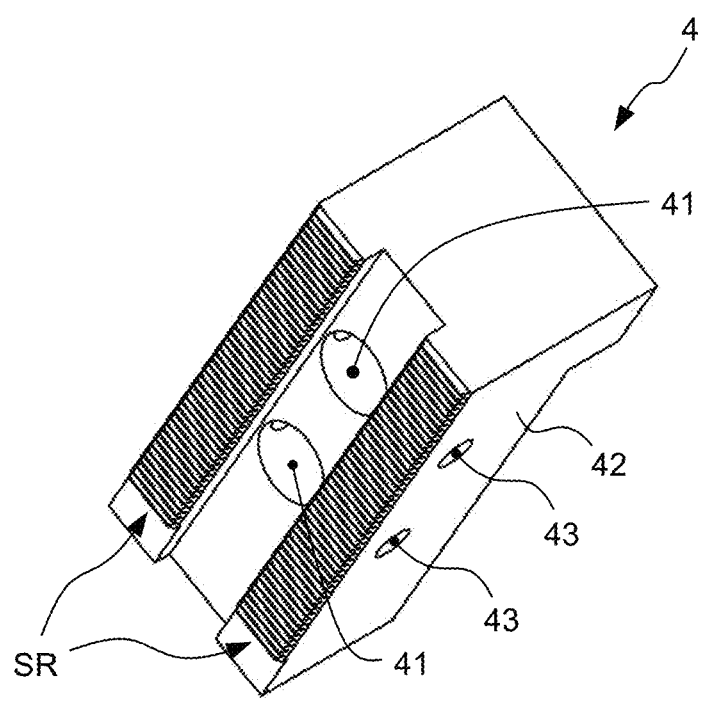
FIG. 5 is a perspective view of a top jaw.
Figure 6:
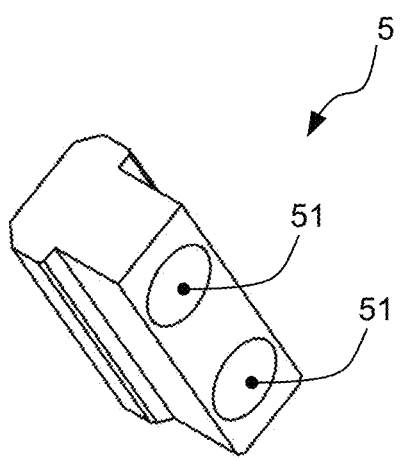
FIG. 6 is a perspective view of a T-nut.

FIGS. 4 to 6 show perspective views of the master jaw 3, the top jaw 4, and the T-nut 5, respectively. The master jaw 3 and the top jaw 4 respectively have a serration SR in which peaks and valleys are continuous. A pitch, which is a distance between adjacent peaks, is configured to be the same on the master jaw 3 and the top jaw 4. The value of the pitch is, for example, 0.5 to 5.0 mm, and specifically is, for example, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6 3.7, 3.8, 3.9, 4.0, 4.1, 4.2, 4.3, 4.4, 4.5, 4.6, 4.7, 4.8, 4.9, 5.0 mm, and may be in a range between any two of the value illustrated above.

The master jaw 3 has an inverted T-shaped groove 31. The T-nut 5 is configured to be insertable into the groove 31 in the master jaw 3.

The top jaw 4 has a through hole 41 for the top jaw bolt 6 to insert therethrough. The T-nut 5 has a bolt hole 51 for screwing into the top jaw bolt 6 when fixing the top jaw 4. In FIGS. 5 and 6, although a case in which both the through hole 41 and the bolt hole 51 are two is shown as an example, the number is not limited to this. Further, the top jaw 4 has two bolt holes 43 for screwing into a bolt 72 in a positioning mechanism 7 described below.

The relative positions of the master jaw 3 and the top jaw 4 can be adjusted pitch by pitch by interlocking the peaks and valleys of the serration SR with each other. A direction in which the peaks and valleys are continuous is an adjustment direction (that is, a radial direction) for adjusting the position of the top jaw 4. After determining the relative positions of the master jaw 3 and the top jaw 4 by the serration SR, the relative position of the top jaw 4 with respect to the master jaw 3 can be fixed by screwing the top jaw bolt 6 into the T-nut 5. In the present embodiment, such a fixed state is referred to as a "defined state".

Further, the internal components of the chuck 1 are not particularly limited. For example, as shown in FIGS. 2A and 2B, the chuck 1 has a plunger 21 that can move in an axial direction of a rotation axis R. The internal components are associated arranged in such a manner that a translational movement of the plunger 21 in the axial direction of the rotation axis R can be converted into a translational movement of the master jaw 3 in the radial direction.

1.2 Positioning Mechanism 7

Next, the positioning mechanism 7 used in the chuck 1 will be described. As shown in FIG. 1B, the positioning mechanism 7 is arranged on a side 42 of the top jaw 4. The positioning mechanism 7 comprises a plate portion 71 and the bolt 72. The plate portion 71 has a long hole 71a, and a longitudinal direction of the long hole 71a coincides with the adjustment direction of the top jaw 4. The plate portion 71 is fixed to the top jaw 4 by inserting the bolt 72 through the long hole 71a and screwing into the bolt hole 43 in the top jaw 4 at a desired position.

A plate projecting piece 73 (an example of "contact portion" in the scope of claims) extends in the direction from the top jaw 4 to the master jaw 3 at an end 71b of the plate portion 71, and is configured to contact an end surface 32 of the master jaw 3. In FIG. 1B, although the plate projecting piece 73 is formed by bending with respect to the plate portion 71, this is only an example and there is no limitation. Any shape may be employed as long as the plate projecting piece 73 is configured to contact the end surface 32 of the master jaw 3.

In other words, the positioning mechanism 7 is provided on the top jaw 4 and comprises the plate portion 71 having the long hole 71a, the pate projecting piece 73 is provided on the end 71b of the plate portion 71, the long hole 71a is provided in such a manner that the adjustment direction is the longitudinal direction, and the relative position of the plate projecting piece 73 can be adjusted in the adjustment direction by inserting the bolt 72 through the long hole 71a and fixing the plate portion 71 to the desired position on the top jaw 4. Then, the position of the plate portion 71 can be adjusted in the adjustment direction in such a manner that the plate projecting piece 73 contacts the top jaw 4 in a defined state.

In the first embodiment, when the top jaw 4 is attached to the master jaw 3 for the first time, the position adjustment of the top jaw 4 is performed, and the top jaw bolt 6 is inserted through the through hole 41 of the top jaw 4 and screwed into the bolt hole 51 provided on the T-nut 5. As a result, the top jaw 4 is firmly fixed at a predetermined position with respect to the master jaw 3. This is the defined state regarding the master jaw 3 and the top jaw 4.

Then, the plate portion 71 is arranged in such a manner that the plate projecting piece 73 contacts the end surface 32 of the master jaw 3, and the bolt 72 is inserted through the long hole 71a and screwed into the bolt hole 43 in the top jaw 4. Especially for improving stability, it is preferable to provide two or more (multiple) bolts 72. With the present operation, the positional relationship between the plate portion 71 and the top jaw 4 is fixed. The plate projecting piece 73 of the plate portion 71 fixed in this way becomes a standard for positioning next time and after.

In the mounting work of the top jaw 4 second time and after, the plate portion 71 including the plate projecting piece 73 has already been fixed to the top jaw 4. Therefore, after arranging the top jaw 4 at a position where the plate projecting piece 73 contacts the end surface 32 of the master jaw 3, the top jaw 4 can be fixed to the master jaw 3 by screwing the top jaw bolt 6 into the bolt hole 51 in the T-nut 5. At this point, the relative position of the top jaw 4 with respect to the master jaw 3 is the same as in the first adjustment, which means the past position can be easily reproduced.

It is assumed that the top jaw 4 may worn down with the use of the chuck 1. In this case, the top jaw 4 may be machined again and thereby changing the interlock of the peaks and valleys of the serration SR. Even in this case, the positioning mechanism 7 can function by adjusting the position of the plate portion 71 again.

In this way, in the chuck 1 according to the first embodiment, when performing the mounting work of the top jaw 4 having a record of positioning in the past, additional work such as measuring the step difference between the end surfaces of the master jaw 3 and the top jaw 4 again is unnecessary. That is, the mounting work of the top jaw 4 can be performed reliably in the defined state in a short time while avoiding human error. In particular, there is no need for a person to confirm the position of the interlock of the serration on a machine drawing, which can suppress mounting error or any occurrence of problem caused thereby. Further, in the present embodiment, it should be noted that the components of the positioning mechanism 7 are particularly light and inexpensive, and the amount of the positioning mechanism 7 protruding from the outer circumference of the chuck 1 is small.

2. Second Embodiment

Figure 7:
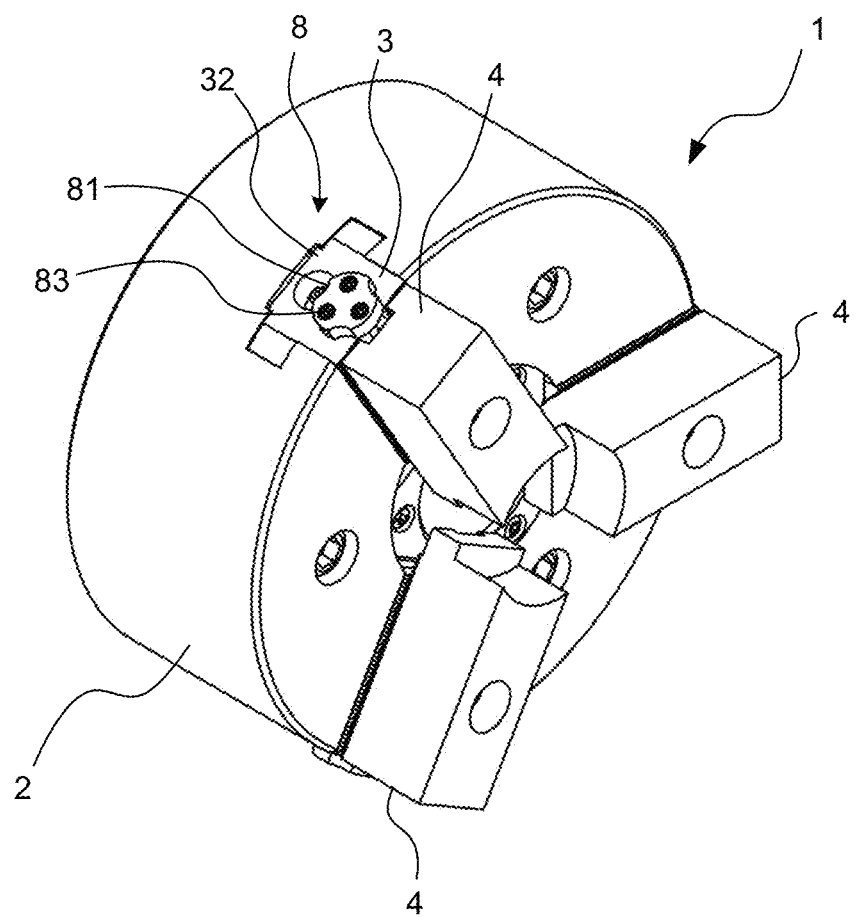
FIG. 7 is a perspective view of a chuck according to a second embodiment.
Figure 8A:
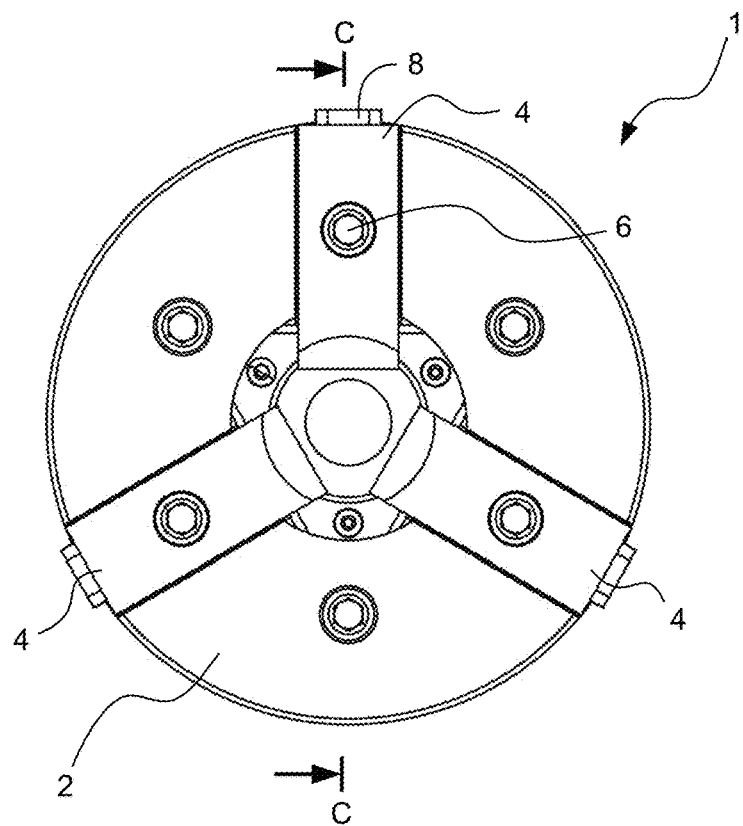
FIG. 8A is a front view of the chuck according to the second embodiment.
Figure 8B:
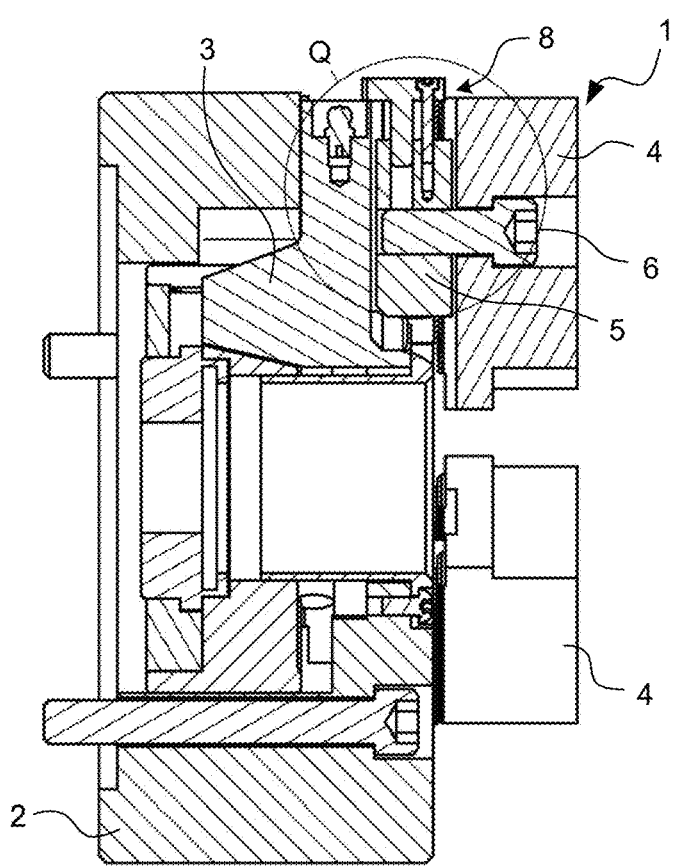
FIG. 8B is a cross-sectional view along line C-C in FIG. 8A.
Figure 9:
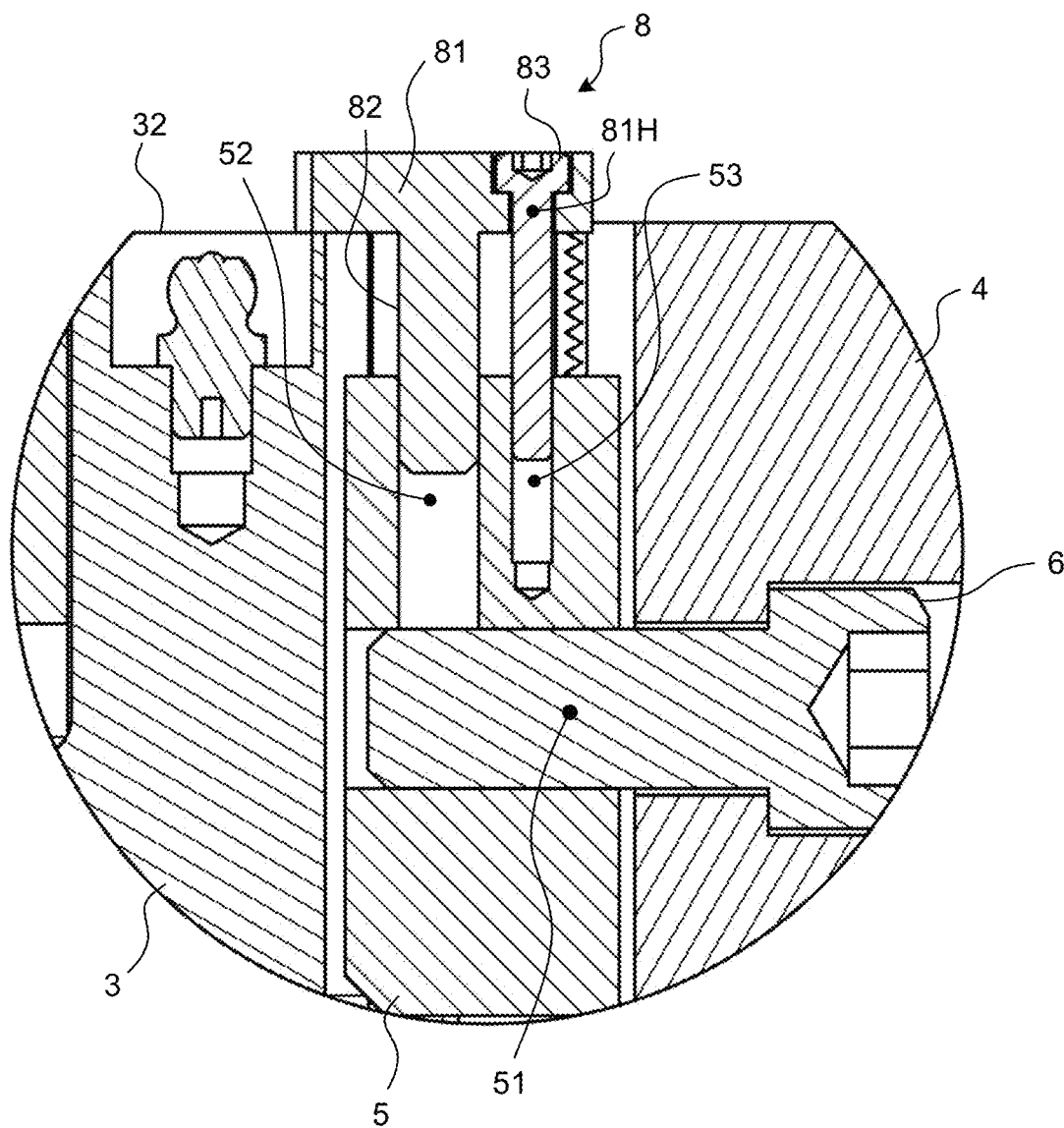
FIG. 9 is a partial enlarged view of a region Q in FIG. 8B.

In section 2, a chuck 1 according to the second embodiment will be described. However, the description of the common parts with the chuck 1 according to the first embodiment will be omitted hereinafter. FIG. 7 shows a perspective diagram of the chuck 1 according to the second embodiment. FIG. 8A shows a front view of the chuck 1 according to the second embodiment, and FIG. 8B shows a cross-sectional view along line C-C in FIG. 8A. Further, FIG. 9 shows a partial enlarged view of a region Q in FIG. 8B.

The chuck 1 according to the second embodiment comprises a positioning mechanism 8 formed in a flange shape. More specifically, the positioning mechanism 8 comprises a flange portion 81 (an example of "contact portion" in the scope of claims) and a shaft portion 82 having a screw thread. The flange portion 81 has a through hole 81H for inserting a bolt 83 that serves as a stopper. A T-nut 5 has a bolt hole 52 for screwing the shaft portion 82 and a bolt hole 53 for screwing the bolt 83 that serves as a stopper. The flange portion 81 screws the shaft portion 82 into the bolt hole 52 until the flange portion 81 moves to a position where the flange 81 contacts an end surface 32 of a master jaw 3, and further screws the bolt 83 into the bolt hole 53 through the through hole 81H to prevent the rotation of the shaft portion 82. By realizing this state, the positioning mechanism 8 functions.

In other words, in the chuck 1 according to the second embodiment, the T-nut 5 comprises the bolt hole 52, the positioning mechanism 8 is provided on the T-nut 5, and the positioning mechanism 8 is provided with the shaft portion 82 having the screw thread and a flange shaped flange portion 81 at the end thereof, the relative position of the flange portion 81 can be adjusted in the adjustment direction by screwing the shaft portion 82 into the bolt hole 52 to change the relative position of the flange portion 81 and preventing the rotation of the shaft portion 82 at a desired position with the bolt 83.

In the second embodiment, as shown in FIGS. 7, 8A and 8B, an example that one top jaw 4 is screwed with one top jaw bolt 6 is shown. Since the number is one, the attachment/dispatchment time of the top jaw bolt 6 can be halved. For improving stability, two or more top jaw bolts 6 may be used. Further, in FIGS. 7, 8A, 8B, and 9, three bolts 83 are used to prevent the rotation of the shaft portion 82, but this is merely an example and is not limited thereto.

In the second embodiment, when attaching a top jaw 4 to the master jaw 3 for the first time, the position adjustment of the top jaw 4 is performed, and the top jaw bolt 6 is inserted through the through hole 41 of the top jaw 4 and screwed into the bolt hole 51 provided on the T-nut 5. As a result, the top jaw 4 is firmly fixed at a predetermined position with respect to the master jaw 3. This is the defined state regarding the master jaw 3 and the top jaw 4.

Next, by screwing the shaft portion 82 in the positioning mechanism 8 into the bolt hole 52, the flange portion 81 is moved to a position where the flange portion 81 contacts the end surface 32 of the master jaw 3. Then, the flange portion 81 fixes the bolt 83 to prevent the rotation of the shaft portion 82. The flange portion 81 becomes a standard for positioning next time and after. However, it is necessary to match the positions of the through hole 81H of the flange portion 81 and the bolt hole 53 of the T-nut 5 for fixing the bolt 83. Therefore, with respect to the flange portion 81, it is necessary to move the rotational position back slightly from the state where the flange portion 81 contacts the end surface 32 of the master jaw 3. As a result, although there will be a gap between the flange portion 81 and the end surface 32, which is at most the screw pitch of the shaft portion 82 divided by the number of the bolt holes 53 (3 in the present embodiment), if the gap is sufficiently smaller than the pitch of the serration, then even if the top jaw bolt 6 is screwed into the T-nut 5 from the contacted state, the defined state is reproduced by the interlock of the serration SR.

In the mounting work of the top jaw 4 second time and after, the T-nut 5 to which the positioning mechanism 8 is already attached is arranged, and the T-nut 5 fits into the groove 31 of the master jaw 3 in a state where the flange portion 81 contacts the master jaw 3. Finally, the top jaw 4 can be fixed to the master jaw 3 by screwing the top jaw bolt 6 into the bolt hole 51 in the T nut 5. At this point, the relative position of the top jaw 4 with respect to the master jaw 3 is the same as in the first adjustment.

It is assumed that the top jaw 4 may worn down with the use of the chuck 1. In this case, the top jaw 4 may be machined again to change the interlock of the peaks and valleys of the serration SR. Even in this case, the positioning mechanism 8 can function by adjusting the position of the flange portion 81 again.

In this way, the chuck 1 according to the second embodiment is the same as the chuck 1 according to the first embodiment, when performing the mounting work of the top jaw 4 having a record of positioning in the past, additional work such as measuring the step difference between the end surfaces of the master jaw 3 and the top jaw 4 again is unnecessary. That is, the mounting work of the top jaw 4 can be performed with high accuracy in a short time while avoiding human error. In particular, there is no need for a person to confirm the position of the interlock of the serration on a machine drawing, which can suppress mounting error or any occurrence of problem caused thereby. Further, in the present embodiment, it should be noted that the amount of the positioning mechanism 8 protruding from the outer circumference of the chuck 1 is small.

3. Modifications

In section 3, modifications of the chuck 1 according to the embodiments described above will be illustrated. In other words, the chuck 1 may be implemented in the following manners.

Figure 10:
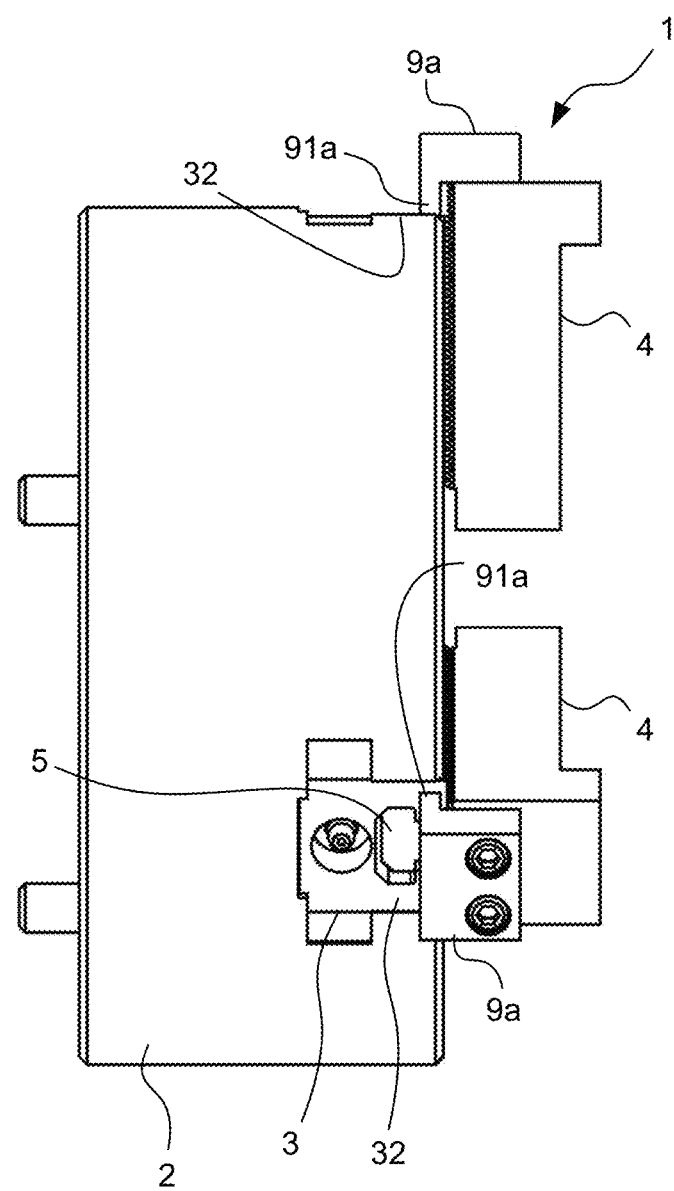
FIG. 10 is a side view of a chuck comprising a positioning mechanism according to a first modification.

As a first modification, a hook shaped positioning mechanism 9a (hook shaped block) is fixed to a top jaw 4 (see FIG. 10). It is preferable to have multiple types of the positioning mechanism 9a for each pitch of the serration SR. By selecting the desired positioning mechanism 9a at the first time of operation, a contact portion 91a contacts an end surface 32 of a master jaw 3 to realize the defined state, and the second and subsequent reproductions can be easily performed.

Figure 11A:
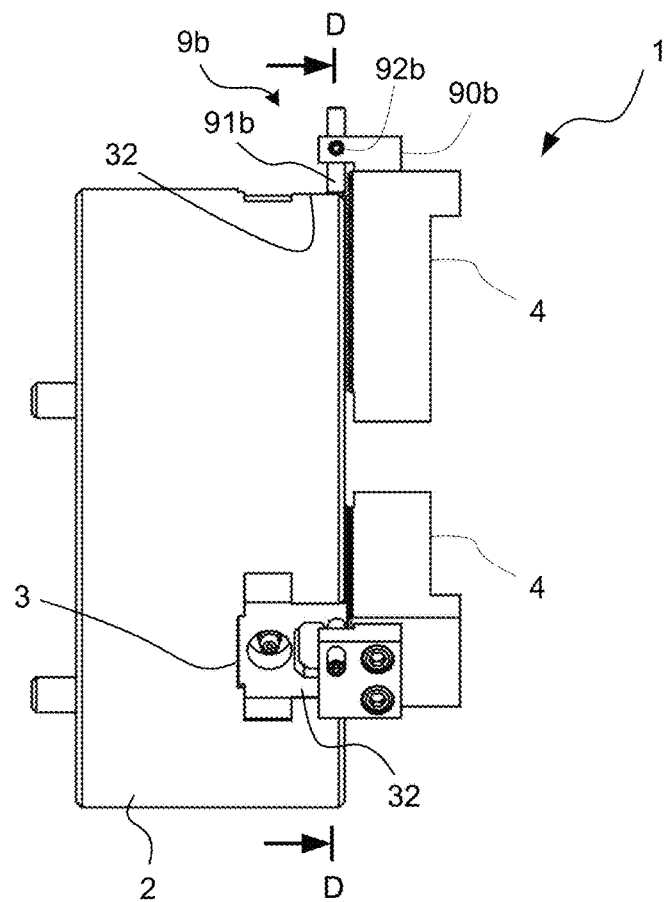
FIG. 11A is a side view of a chuck comprising a positioning mechanism according to a second modification.
Figure 11B:
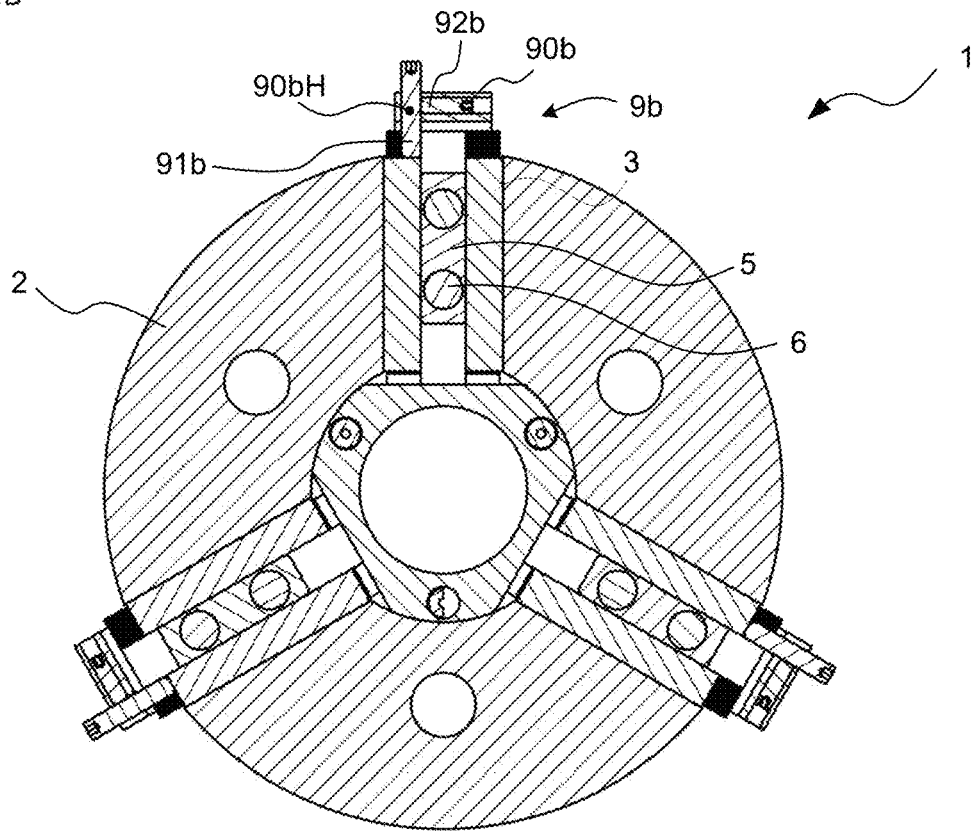
FIG. 11B is a cross-sectional view along line D-D in FIG. 11A.

As a second modification, a positioning mechanism 9b comprise a main body 90b and a contact portion 91b configured to be variably positioned in the adjustment direction with respect to the main body 90b. Such a positioning mechanism 9b is fixed to a top jaw 4 (see FIGS. 11A and 11B). More specifically, the contact portion 91b penetrates through the through hole 90bH provided in the body 90b, and the position of the contact portion 91b can be adjusted by pressing the contact portion 91b with the bolt 92b. In other words, the contact portion 91b contacts an end surface 32 of a master jaw 3 to realize the defined state, and the reproduction can be easily performed second time and after.

Figure 12A:
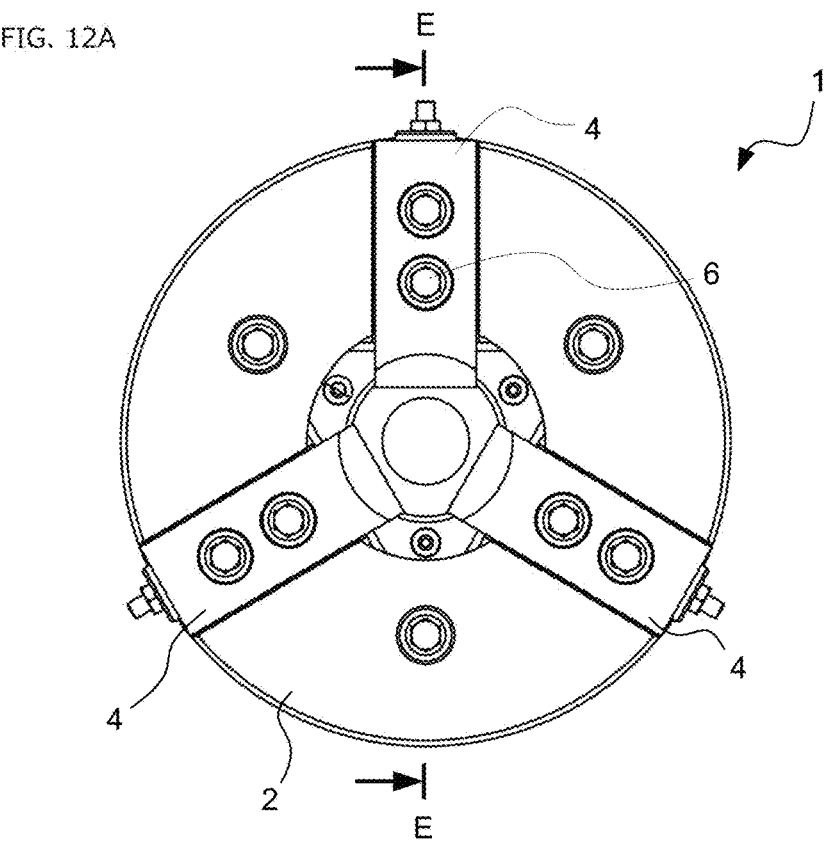
FIG. 12A is a front view of a chuck comprising a positioning mechanism according to a third modification.
Figure 12B:
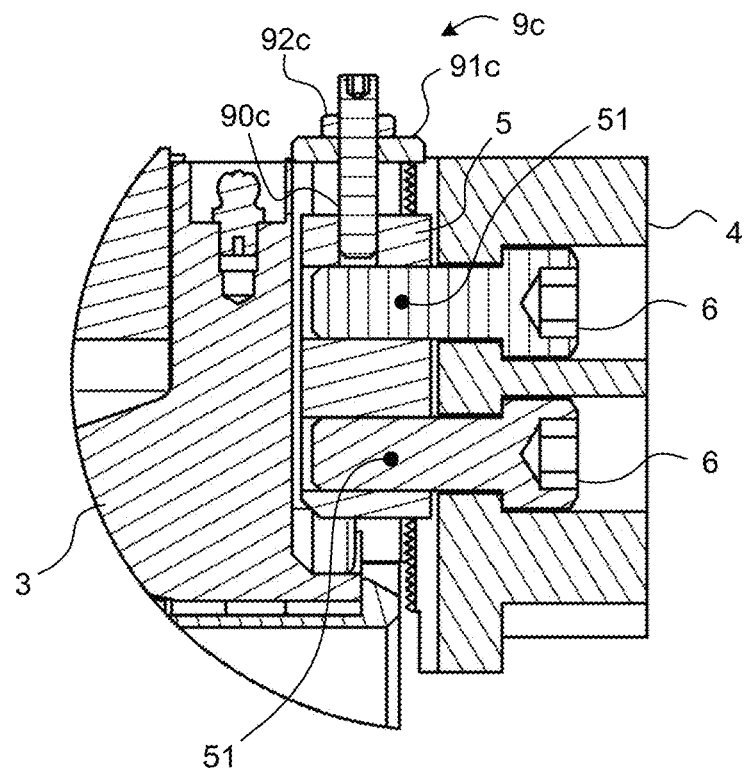
FIG. 12B is a cross-sectional view along line E-E in FIG. 12A.

As a third modification, a positioning mechanism 9c comprises a bolt 90c fixed to a T-nut 5 and nuts 91c and 92c (double nuts) screwed into the bolt 90c. Such a positioning mechanism 9c is fixed to the T-nut 5 (see FIGS. 12A and 12B). The positions of the nut 91c and 92c can be fixed by rotating the nut 91c to adjust the position of the nut 91c with respect to the bolt 90c and further rotating a nut 91d to contact the adjusted nut 91c. By making the nut 91c function as a contact portion to contact an end surface 32 of a master jaw 3, the defined state can be realized, and the reproduction can be easily performed second time and after as same as the aforementioned embodiments and modifications.

By the way, the chuck 1 as an example of the structure has been shown in the first and second embodiments and the first to third modifications, wherein the first portion is a plurality of master jaws 3 configured to be opened/closed in a radial direction, the second portion is a plurality of top jaws 4 configured to be attachable to/detachable from the master jaws, and the fixing portion is a T-nut 5 having an inverted T-shape. Of course, this is only an example, other structures such as a gripping tool employing a serration used in a machining center may be applied as well.

4. Conclusion

As described above, a structure capable of reducing the risk of human error when reproducing the relative positions of two portions as in the past can be implemented according to the embodiments.

It may be provided in each of the following aspects.

In the structure, the positioning mechanism is configured to adjust the relative position of the contact portion with respect to the first portion in the adjustment direction in such a manner that the contact portion contacts the first portion in the defined state.

In the structure, the positioning mechanism is provided on the second portion, and comprises a plate portion with a long hole, the contact portion is provided on an end of the plate portion, and the long hole is provided in such a manner that the adjustment direction is a longitudinal direction, and is configured to adjust the relative position of the contact portion in the adjustment direction by inserting a screw therethrough and fixing the plate portion at a desired position on the second portion.

In the structure, the screw is a plurality of screws.

In the structure, the fixing portion has a screw hole, the positioning mechanism is provided on the fixing portion, and comprises a shaft portion having a screw thread, the contact portion in a flange shape is provided on an end of the shaft, the relative position of the contact portion is variable by screwing the shaft portion into the screw hole, and the structure is configured to adjust the relative position of the contact portion in the adjustment direction by preventing a rotation of the shaft portion with a stopper.

In the structure, the second portion is screwed to the fixing portion by one screw.

In the structure, the structure is a chuck, the first portion is a plurality of master jaws configured to be opened/closed in a radial direction, the second portion is a plurality of top jaws configured to be attachable to/detachable from the master jaws, and the fixing portion is a T-nut having an inverted T-shape.

Of course, the above embodiments are not limited thereto.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

REFERENCE SIGNS LIST

1: Chuck
3: Master jaw
4: Top jaw
5: T-nut
7: Positioning mechanism
71: Plate portion
71a: Long hole
71b: End
72: Bolt
73: Plate projecting piece
8: Positioning mechanism
81: Flange portion
82: Shaft portion
83: Bolt
9a: Positioning mechanism
91a: Contact portion
9b: Positioning mechanism
91b: Contact portion
9c: Positioning mechanism
91c: Nut
SR: Serration

What is claimed is:
1. A structure, comprising:
first and second portions
respectively having a serration in which peaks and valleys are continuous, and
configured to adjust relative positions of the first and second portions in an adjustment direction by interlocking the peaks and valleys with each other, wherein the adjustment direction is a direction in which the peaks and valleys of the serration are continuous;
a fixing portion configured to maintain a defined state, wherein the defined state is a state in which the peaks and valleys are interlocked with each other and the relative positions of the first and second portions are fixed; and
a positioning mechanism
provided on the second portion or the fixing portion, and
having a contact portion configured to contact the first portion in the defined state in such a manner that a position of the interlock of the serration can be reproduced, and wherein:
the positioning mechanism is configured to adjust the relative position of the contact portion with respect to the first portion in the adjustment direction in such a manner that the contact portion contacts the first portion in the defined state,
the fixing portion has a screw hole,
the positioning mechanism
is provided on the fixing portion, and comprises a shaft portion having a screw thread, the contact portion in a flange shape is provided on an end of the shaft, the relative position of the contact portion is variable by screwing the shaft portion into the screw hole, and the structure is configured to adjust the relative position of the contact portion in the adjustment direction by preventing a rotation of the shaft portion with a stopper.

2. The structure according to claim 1, wherein:

the positioning mechanism
is provided on the second portion, and
comprises a plate portion with a long hole, the contact portion is provided on an end of the plate portion, and the long hole is provided in such a manner that the adjustment direction is a longitudinal direction, and is configured to adjust the relative position of the contact portion in the adjustment direction by inserting a screw therethrough and fixing the plate portion at a desired position on the second portion.

3. The structure according to claim 2 wherein: the screw is a plurality of screws.

4. The structure according to claim 1, wherein:
the second portion is screwed to the fixing portion by one screw.

5. The structure according to claim 1, wherein:
the structure is a chuck,
the first portion is a plurality of master jaws configured to be opened/closed in a radial direction,
the second portion is a plurality of top jaws configured to be attachable to/detachable from the master jaws, and
the fixing portion is a T-nut having an inverted T-shape.

* * * * *